(12) United States Patent
Ho et al.

(10) Patent No.: US 10,498,254 B2
(45) Date of Patent: Dec. 3, 2019

(54) POWER CONVERSION DEVICE, SLOW SOFT-STARTUP CIRCUIT, AND POWER CONVERSION CHIP

(71) Applicant: RICHTEK TECHNOLOGY CORPORATION, Zhubei, Hsinchu (TW)

(72) Inventors: Jyun-Che Ho, Xikou Township, Chiayi (TW); Isaac Y. Chen, Zhubei (TW); Yi-Wei Lee, Taipei (TW)

(73) Assignee: RICHTEK TECHNOLOGY CORPORATION, Zhubei, Hsinchu (TW)

( * ) Notice: Subject to any disclaimer, the term of this patent is extended or adjusted under 35 U.S.C. 154(b) by 136 days.

(21) Appl. No.: 15/632,321

(22) Filed: Jun. 24, 2017

(65) Prior Publication Data

US 2018/0309385 A1  Oct. 25, 2018

(30) Foreign Application Priority Data

Apr. 21, 2017 (TW) .............................. 106113386 A

(51) Int. Cl.

| H03K 5/08 | (2006.01) |
| H02M 3/156 | (2006.01) |
| H03K 19/00 | (2006.01) |
| H03L 7/00 | (2006.01) |
| H02M 3/04 | (2006.01) |
| H02M 1/36 | (2007.01) |
| H02M 7/48 | (2007.01) |

(Continued)

(52) U.S. Cl.
CPC ............ *H02M 7/4807* (2013.01); *G05F 1/40* (2013.01); *H02M 1/36* (2013.01); *H02M 3/156* (2013.01); *H02M 3/335* (2013.01); *H02M 3/33507* (2013.01)

(58) Field of Classification Search
CPC ...... H02M 7/4807; H02M 1/36; H02M 3/156; H02M 3/335; H02M 3/33507; G05F 1/40
USPC ......................................... 327/142, 143, 198
See application file for complete search history.

(56) References Cited

U.S. PATENT DOCUMENTS

| 7,880,447 B1 * | 2/2011 | Lin ................... H02M 3/33515 320/166 |
| 9,407,154 B2 * | 8/2016 | Freeman ........... H02M 3/33523 |

(Continued)

*Primary Examiner* — Brandon S Cole
(74) *Attorney, Agent, or Firm* — Tung & Associates

(57) ABSTRACT

The invention provides a power conversion device, including: a voltage conversion stage, including a primary side for receiving a rectified voltage and a secondary side for generating a rectified voltage according to the rectified voltage, wherein the primary side includes a primary side switch; a switch control circuit having a startup status and a normal operation status, the switch control circuit being configured to operably provide a control signal to a control terminal of the primary side switch; a startup circuit, providing a current to the control terminal when the switch control circuit is in the startup status, to at least partially conduct the primary side switch; and a slow soft-startup circuit, wherein when the switch control circuit is in the startup status and the output voltage does not reach a predetermined voltage in a first predetermined time period, the slow soft-startup circuit reduces a total current quantity supplied to the control terminal in a second predetermined time period which is after the first predetermined time period.

18 Claims, 11 Drawing Sheets

(51) Int. Cl.
*H02M 3/335* (2006.01)
*G05F 1/40* (2006.01)

(56) References Cited

U.S. PATENT DOCUMENTS

| | | | |
|---|---|---|---|
| 2003/0034765 A1* | 2/2003 | Yang | H02M 1/40 323/284 |
| 2012/0176819 A1* | 7/2012 | Gao | H02M 1/36 363/21.12 |
| 2013/0121044 A1* | 5/2013 | Gao | H02M 1/32 363/50 |
| 2014/0126254 A1* | 5/2014 | Al-Shyoukh | G05F 1/468 363/49 |
| 2014/0233283 A1* | 8/2014 | Al-Shyoukh | H02M 1/36 363/49 |
| 2015/0256060 A1* | 9/2015 | Faingersh | H02M 1/36 323/267 |

* cited by examiner

POWER CONVERSION DEVICE, SLOW SOFT-STARTUP CIRCUIT, AND POWER CONVERSION CHIP

CROSS REFERENCE

The present invention claims priority to TW 106113386, filed on Apr. 21, 2017.

BACKGROUND OF THE INVENTION

Field of Invention

The present invention relates to a power conversion device, especially a power conversion device configured to provide a protection against an output short-circuit problem in a startup status.

Description of Related Art

FIG. 1 shows a prior art power conversion device 10, which includes a voltage conversion stage 11, and a switch control circuit 12 and a startup circuit which control the voltage conversion stage 11. The startup circuit includes a resistor R and a charge control circuit 13. The voltage conversion stage 11 includes a transformer, which has a primary side for receiving a rectified voltage Vin, and a secondary side for generating an output voltage Vo. The voltage conversion stage 11 includes a primary side switch M (including a control terminal G) at the primary side, for controlling a current conduction status at the primary side.

Referring to FIG. 2, when the power conversion device 10 just starts, the switch control circuit 12 is in a startup status and has not entered normal operation, the switch control circuit 12 is not yet ready to generate a proper control signal to control the primary side switch M. The resistor R of the startup circuit provides charges (the startup current Is) which are accumulated at the control terminal M, and the accumulated charges partially conduct the primary side switch M. The charge control circuit 13 senses a primary side current Ip and periodically releases the accumulated charges at the control terminal G accordingly, such that the control terminal M receives a startup voltage waveform including repeated peaks and valleys. After the voltage conversion stage 11 has started up and the output voltage Vo reaches a threshold, the power conversion device 10 enters the normal operation status, and the switch control circuit 12 takes control of the primary side switch M. However, if due to any reason the load connected to the output voltage Vo has a short-circuit problem, the output voltage Vo will not be able to reach the threshold, and in this case the charge control circuit 13 will keep controlling the primary side switch M in a partial conduction status. Importantly, the partial conduction status of the primary side switch M has a higher conduction resistance. When the primary side switch M is kept in this partial conduction status, it can cause a high temperature or even damage the circuit.

According to the above, it is important to provide a protection for the power conversion device in the startup status.

SUMMARY OF THE INVENTION

In one perspective, the present invention provides a power conversion device, which includes: a voltage conversion stage, including a primary side for receiving a rectified voltage and a secondary side for generating an output voltage according to the rectified voltage, the primary side including a primary side switch which is controlled by a control signal to control a current conduction status at the primary side; a switch control circuit, having a startup status and a normal operation status, the switch control circuit providing the control signal when the switch control circuit is in the normal operation status, to a control terminal of the primary side switch for controlling a current conduction status of the primary side switch; a startup circuit, configured to operably provide a current to the control terminal of the primary side switch when the switch control circuit is in the startup status, to at least partially conduct the primary side switch; and a slow soft-startup circuit, configured to operably adjust the control signal when the switch control circuit is in the startup status, wherein when the output voltage does not reach a predetermined level in a first predetermined time period, the slow soft-startup circuit reduces a total current quantity supplied to the control terminal in a second predetermined time period, which is another time period after the first predetermined time period.

In one embodiment, the slow soft-startup circuit stops reducing the total current quantity supplied to the control terminal in a third predetermined time period, which is another time period after the second predetermined time period.

In one embodiment, when the switch control circuit is in the startup status, the startup circuit adjusts the control signal to have a voltage waveform including repeated peaks and valleys, and wherein the slow soft-startup circuit reduces the total current quantity supplied to the control terminal in the second predetermined time period by one or more of following steps: the slow soft-startup circuit prolonging a time period from the valley to the peak in the second predetermined time period; the slow soft-startup circuit reducing a frequency of reaching the peak in the second predetermined time period; and/or the slow soft-startup circuit prolonging a duration of the voltage waveform staying at the valley.

In one embodiment, the slow soft-startup circuit includes: at least one current discharge circuit, coupled between the control terminal of the primary side switch and ground; and a control unit, configured to operably control a current conduction status of the current discharge circuit, wherein when the switch control circuit is in the startup status and the output voltage does not reach the predetermined level in the first predetermined time period, the control signal has a voltage waveform including repeated peaks and valleys, and the control unit conducts the at least one current discharge circuit to prolong a time period from the valley to the peak in the second predetermined time period.

In one embodiment, each current discharge circuit includes a current switch and a current source connected in series, the series circuit of the current switch and the current source being coupled between the control terminal of the primary side switch and ground, wherein when the current switch is conducted, the control terminal of the primary side switch is conducted to the ground through the current source, to reduce the total current quantity supplied to the control signal in the second predetermined time period.

In one embodiment, the slow soft-startup circuit includes a plurality of current discharge circuits, wherein when the switch control circuit is in the startup status and the output voltage does not reach the predetermined level in the first predetermined time period, the control unit gradually increases a number of the current discharge circuits which are conducted in the second predetermined time period, to reduce the total current quantity supplied to the control terminal in the second predetermined time period.

In one embodiment, when the control unit conducts the current discharge circuits till an end of the second predetermined time period, the control unit stops conducting the current discharge circuits, so as to determine whether the output voltage reaches the predetermined level in the third predetermined time period, wherein the third predetermined time period is another time period after the second predetermined time period.

In one embodiment, when the output voltage reaches the predetermined level, a power-on reset signal is generated to switch the switch control circuit from the startup status to the normal operation status.

In one embodiment, the slow soft-startup circuit stops adjusting the control signal according to the power-on reset signal.

In one embodiment, when the switch control circuit is in the startup status, the startup circuit adjusts the control signal to have a voltage waveform including repeated peaks and valleys, wherein the startup circuit includes: a resistor, coupled between the rectified voltage and the control terminal of the primary side switch; a grounding switch, coupled between the control terminal of the primary side switch and ground; and a pulse generator, configured to alternately generate a plurality of pulses for turning the grounding switch on and off.

In one embodiment, the slow soft-startup circuit is coupled between the pulse generator and ground, and is configured to prolong a time length of at least one of the pulses, wherein when the switch control circuit is in the startup status and the slow soft-startup circuit receives the pulse, the slow soft-startup circuit prolongs a conduction time period of the grounding switch, so as to prolong a duration of the voltage waveform staying at the valley.

In one embodiment, the power conversion device further includes a power supply circuit, which is coupled to the control terminal of the primary side switch, for supplying power to the startup circuit and the slow soft-startup circuit.

In one perspective, the present invention provides a slow soft-startup circuit, for controlling a voltage conversion circuit which includes a primary side for receiving a rectified voltage and a secondary side for generating an output voltage according to the rectified voltage, the primary side including a primary side switch, wherein the voltage conversion circuit further includes a switch control circuit and a startup circuit, the switch control circuit having a startup status and a normal operation status, the switch control circuit in the startup status providing a control signal to the control terminal of the primary side switch to at least partially conduct the primary side switch, the slow soft-startup circuit comprising: at least one current discharge circuit, coupled between the control terminal of the primary side switch and ground; and a control unit, configured to operably control a current conduction status of the current discharge circuit, wherein when the switch control circuit is in the startup status and the output voltage does not reach a predetermined level in a first predetermined time period, the control unit conducts the at least one current discharge circuit in a second predetermined time period after the first predetermined time period, to reduce a total current quantity supplied to the control terminal in the second predetermined time period.

In one embodiment, the slow soft-startup circuit stops reducing the total current quantity supplied to the control terminal in a third predetermined time period, which is another time period after the second predetermined time period.

In one embodiment, when the output voltage reaches the predetermined level, a power-on reset signal is correspondingly generated, and the slow soft-startup circuit stops reducing the total current quantity supplied to the control terminal according to the power-on reset signal.

In one embodiment, the slow soft-startup circuit includes a plurality of current discharge circuits. When the switch control circuit is in the startup status and the output voltage does not reach the predetermined level in the first predetermined time period, the control unit gradually increases a number of the current discharge circuits which are conducted in the second predetermined time period, to reduce the total current quantity supplied to the control terminal in the second predetermined time period.

In one embodiment, when the control unit conducts the current discharge circuits till an end of the second predetermined time period, the control unit stops conducting the current discharge circuits, so as to determine whether the output voltage reaches the predetermined level in the third predetermined time period, wherein the third predetermined time period is another time period after the second predetermined time period.

In one perspective, the present invention provides a power conversion chip, for controlling a voltage conversion stage which includes a primary side for receiving a rectified voltage and a secondary side for generating an output voltage according to the rectified voltage, the primary side including a primary side switch which includes a control terminal for receiving a startup current from the rectified voltage, wherein the voltage conversion chip has a startup status and a normal operation status, the power conversion chip comprising: a switch control circuit, providing a control signal to a control terminal of the primary side switch when the switch control circuit is in the normal operation status; a startup circuit including: a grounding switch, coupled between the control terminal of the primary side switch and ground; and a pulse generator, configured to operably generate a pulse by comparing a primary side current and a reference value, wherein the pulse conducts the control terminal of the primary side switch to ground, such that the control terminal of the primary side switch receives a voltage waveform including repeated peaks and valleys; and a slow soft-startup circuit, coupled between the pulse generator and the grounding switch, wherein when the power conversion chip is in the startup status and the output voltage does not reach a predetermined level in a first predetermined time period, the slow soft-startup circuit prolongs a duration of the voltage waveform staying at the valley in a second predetermined time period which is another time period after the first predetermined time period.

DESCRIPTION OF THE PREFERRED EMBODIMENTS

The drawings as referred to throughout the description of the present invention are for illustrative purpose only, to show the interrelations between the components, but not drawn according to actual scale.

Figure 1:
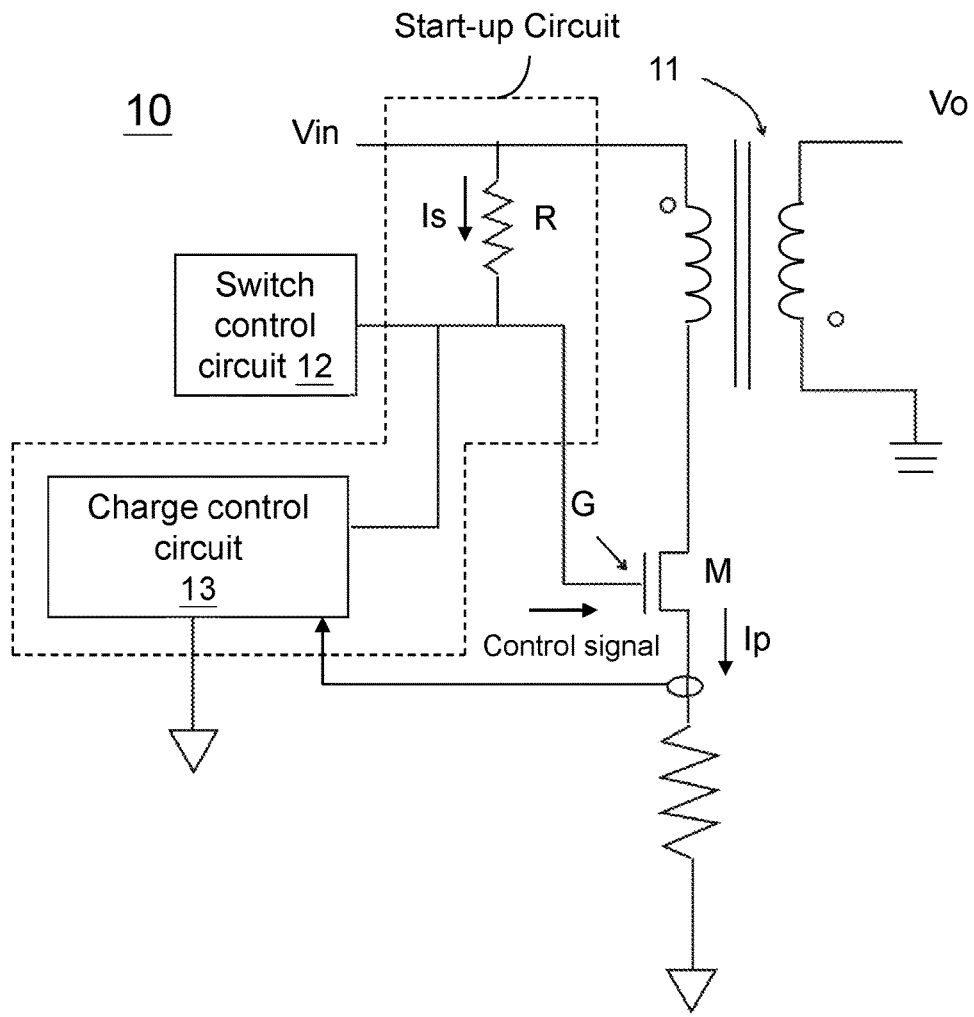
FIG. 1 shows a prior art power conversion device.
Figure 2:
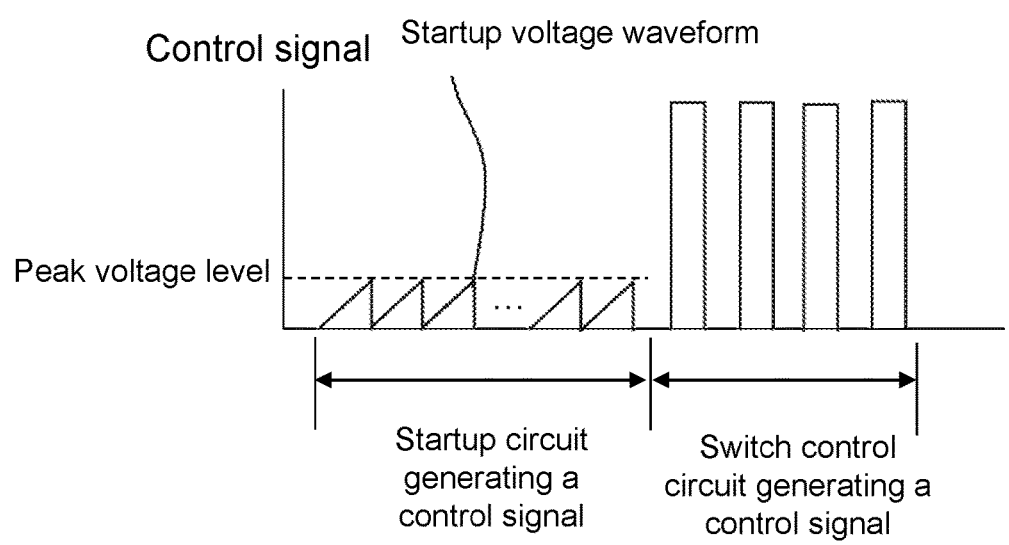
FIG. 2 shows a control signal in the prior art.
Figure 3:
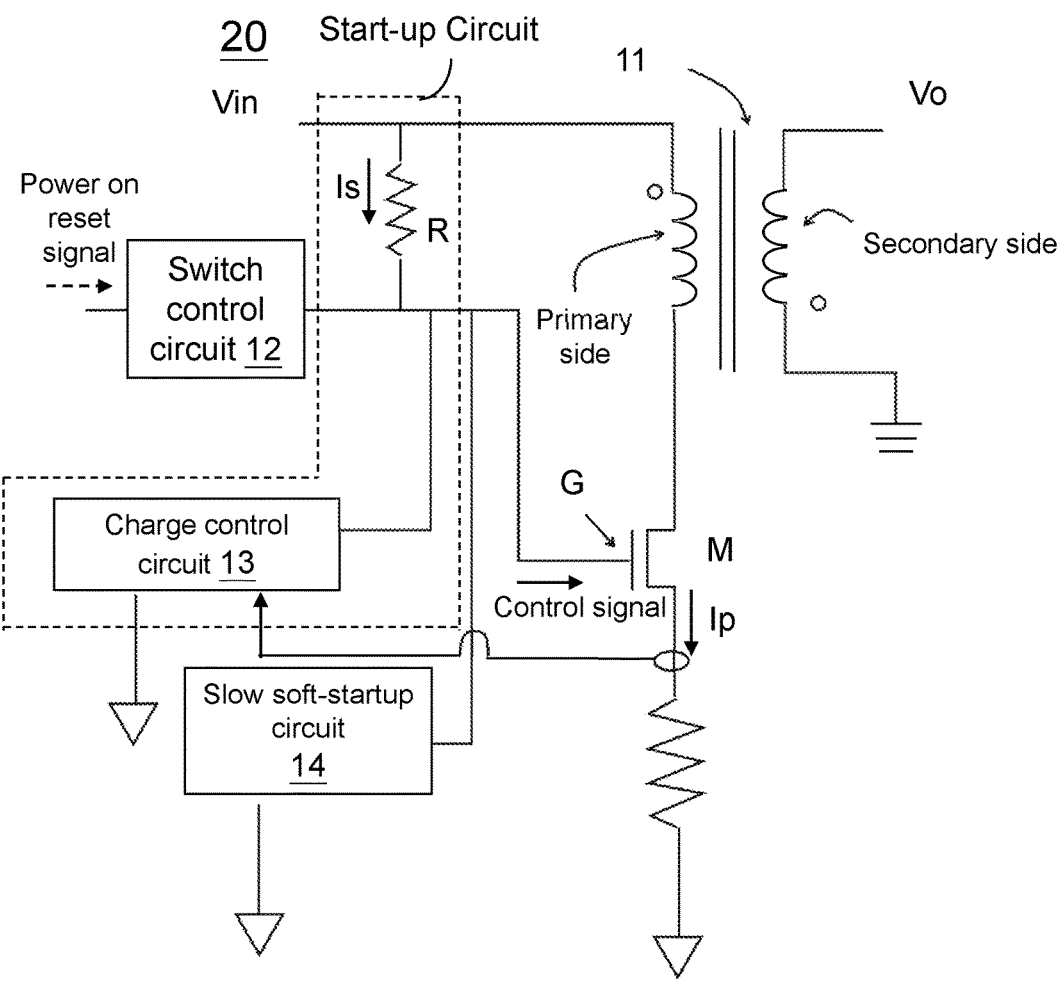
FIG. 3 shows a power conversion device according to one embodiment of the present invention.

FIG. 3 shows a power conversion device 20 according to one embodiment of the present invention. The power conversion device 20 includes: a voltage conversion stage 11, including a primary side for receiving a rectified voltage Vin and a secondary side for generating an output voltage Vo according to the rectified voltage Vin, the primary side including a primary side switch M which is controlled by a control signal to control a current conduction status of a primary side current Ip through the primary side switch M; a switch control circuit 12, having a startup status and a normal operation status, the switch control circuit 12 providing the control signal to a control terminal G of the primary side switch M when the switch control circuit 12 is in the normal operation status, for controlling a current conduction status of the primary side switch M; a startup circuit, including a resistor R and a charge control circuit 13, the startup circuit being configured to operably provide a current to the control terminal G of the primary side switch M when the switch control circuit 12 is in the startup status, to at least partially conduct the primary side switch M; and a slow soft-startup circuit 14, configured to operably adjust the control signal when the switch control circuit 12 is in the startup status, wherein when the output voltage Vo does not reach a predetermined level in a first predetermined time period, the slow soft-startup circuit 14 reduces a total current quantity supplied to the control terminal (charges accumulated at the control terminal) in a second predetermined time period (FIGS. 4, 5, 7, and 10-12), wherein the second predetermined time period is another time period after the first predetermined time period.

Figure 4:
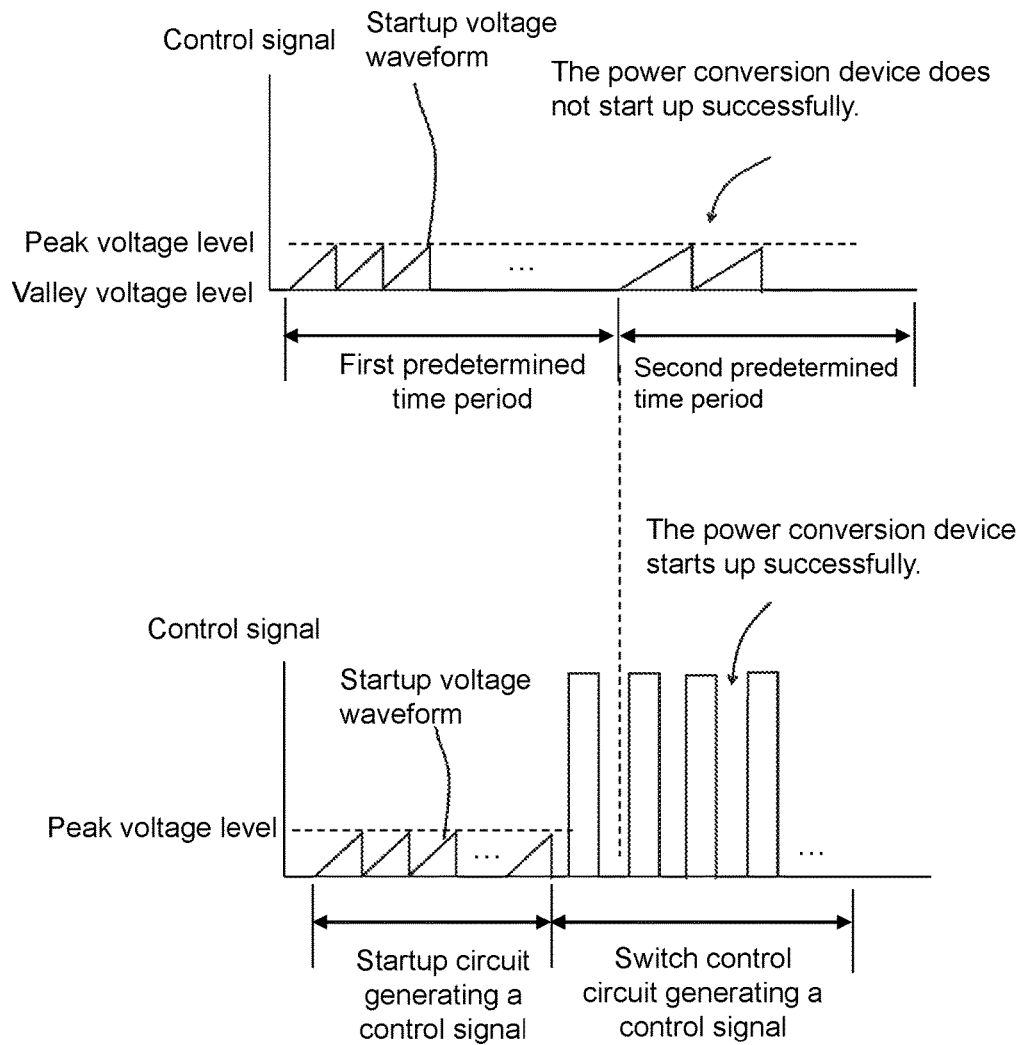
FIG. 4 shows a comparison between the control signal corresponding to when the power conversion device does not start up successfully and the control signal corresponding to when the power conversion device starts up successfully.

FIG. 4 shows a comparison between the control signal corresponding to when the power conversion device does not start up successfully and the control signal corresponding to when the power conversion device starts up successfully. Please refer to FIGS. 3 and 4, wherein when the switch control circuit 12 is in the startup status, the startup circuit generates the control signal which has a startup voltage waveform including repeated peaks and valleys. When the switch control circuit 12 is in the normal operation status, the switch control circuit 12 generates the control signal. When the switch control circuit 12 is in the startup status and does not start up successfully (that is, the power conversion device 20 stays in the startup status) in the first predetermined time period, the slow soft-startup circuit 14 reduces the total current quantity supplied to the control terminal in the second predetermined time period, which is another time period after the first predetermined time period. FIG. 4 shows one embodiment of "reducing the total current quantity supplied to the control terminal". The present invention also provides different embodiments of "reducing the total current quantity supplied to the control terminal", which will be described later. On the other hand, when the power conversion device 20 starts up successfully in the first predetermined time period, the switch control circuit 12 is switched from the startup status to the normal operation status, and the control signal is generated by the switch control circuit 12.

In one embodiment, the output voltage Vo may be used to determine whether the power conversion device 20 starts up successfully or not. When the output voltage Vo reaches the predetermined level, it shows that the power conversion device 20 has started up successfully, and the switch control circuit 12 is switched from the startup status to the normal operation status, whereby the switch control circuit 12 generates the control signal and sends it to the control terminal G. After the switch control circuit 12 is switched from the startup status to the normal operation status, the charge control circuit 13 and the slow soft-startup circuit 14 may be disabled. For example, the slow soft-startup circuit 14 may stop reducing the total current quantity supplied to the control terminal G, and/or the charge control circuit 13 may stop releasing the charges accumulated at the control terminal G.

Whether "the output voltage reaches the predetermined level", may be determined by various ways. For example, typically, when the output voltage Vo reaches the predetermined level, a power-on reset (POR) signal is generated (inside or outside the power conversion device 20 (or outside the power conversion device 20), so the switch control circuit 12 can be switched from the startup status to the normal operation status according to this POR signal. Or, the power conversion device may include a voltage sensing circuit to sense the output voltage Vo, wherein when the sensed output voltage Vo reaches the predetermined level, the switch control circuit 12 is switched from the startup status to the normal operation status, and starts generating the control signal to the control terminal G. FIG. 3 shows the embodiment with the POR signal, but as explained in the above, whether the output voltage reaches the predetermined level may be determined by various other ways.

According to the present invention, when the power conversion device 20 (or the switch control circuit 12) does not start up successfully in the first predetermined time period, the total current quantity supplied to the control terminal G is reduced. "Reducing the total current quantity supplied to the control terminal G" indicates that the integrated conduction time of the control terminal G or the total conduction amount of current is reduced, whereby the heat generated in the primary side switch M is reduced.

Figure 5:
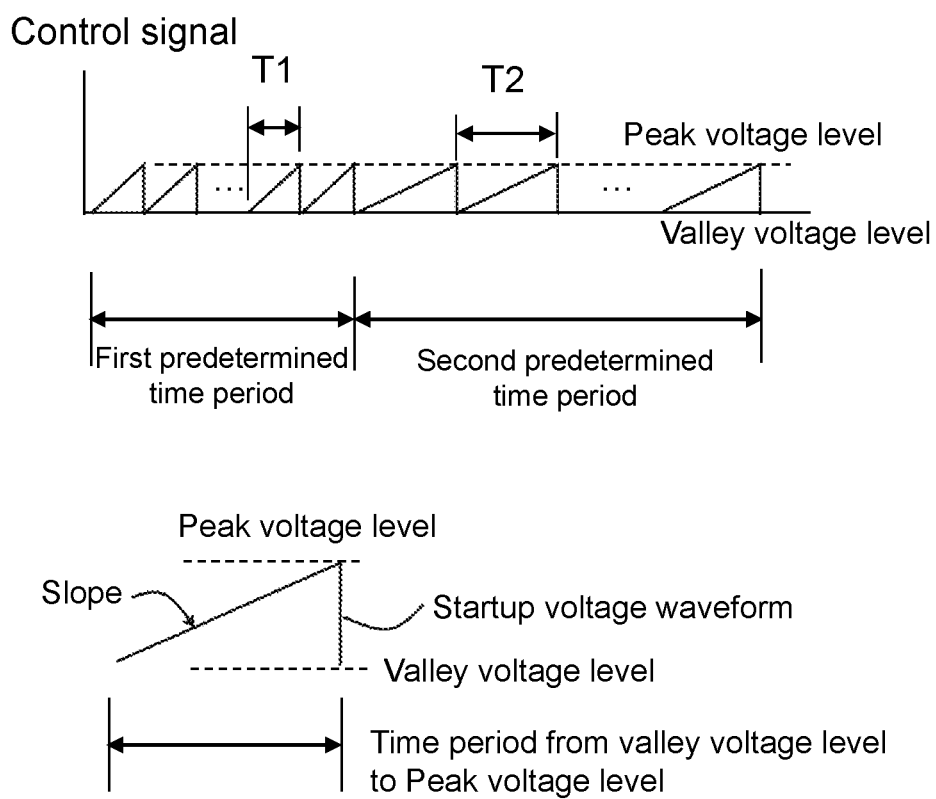
FIG. 5 shows a control signal according to one embodiment of the present invention.

Referring to FIG. 5, one way of reducing the total current quantity supplied to the primary side switch M is to prolong a time period from the valley to the peak in the second predetermined time period (the time period T2 is longer than the time period T1, and the startup voltage waveform has a reduced slope). Because the time period T2 is longer than the time period T1, the frequency (or the number) of the startup voltage waveform reaching the peak is reduced in the second predetermined time period. Thus, the embodiment in FIG. 5 illustrates two ways of reducing the total current quantity supplied to the control terminal G: (1) prolonging a time period from the valley to the peak in the second predetermined time period; or (2) reducing the frequency (or the number) of the startup voltage waveform reaching the peak is reduced in the second predetermined time period.

Besides the embodiment shown in FIG. 5, in another embodiment, the total current quantity supplied to the control terminal G can be reduced by: prolonging a duration of the voltage waveform staying at the valley between a previous cycle and a next cycle, which will be explained later.

Figure 6:
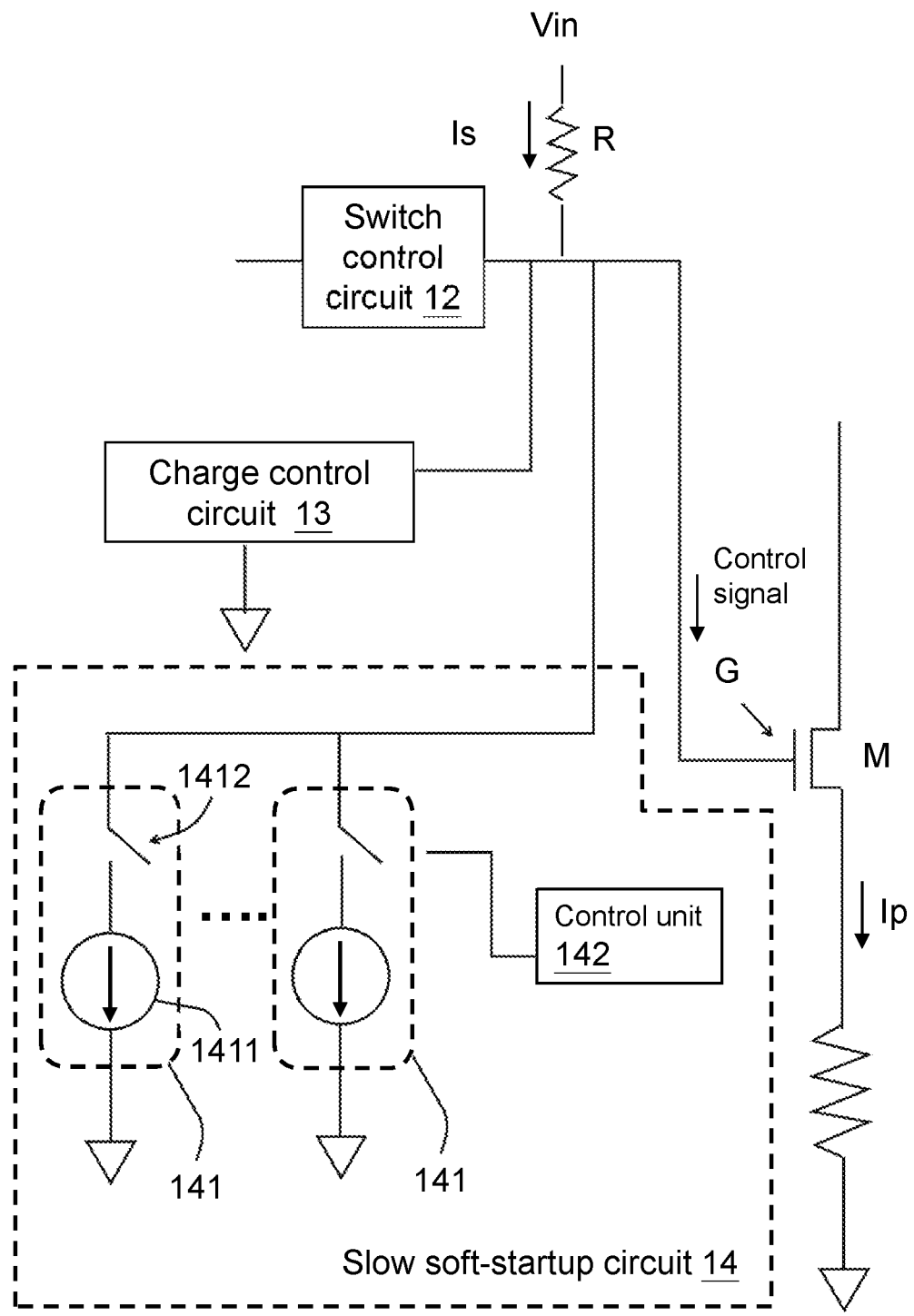
FIG. 6 shows a slow soft-startup circuit according to one embodiment of the present invention.

FIG. 6 shows one embodiment of the slow soft-startup circuit 14, which includes at least one current discharge circuit 141, coupled between the control terminal G of the primary side switch M and ground; and a control unit 142, configured to operably control a current conduction status of the current discharge circuit 141. The control unit 142 may determine the first predetermined time period by to various ways, such as: determining the first predetermined time period by a counter inside the control unit 142; determining the first predetermined time period by counting the number of peaks in the startup voltage waveform; or determining the first predetermined time period by counting a number of the primary side current reaching a current threshold value, etc. After the first predetermined time period ends, the control unit 142 can conduct at least one of the current discharge circuits 141.

When the at least one current discharge circuit 141 conducts the control terminal G to ground, a portion of the startup current Is supplied to the control terminal G through the resistor R, is conducted to ground through the at least one current discharge circuit 141. When the number of the conducted current discharge circuit 141 increases, the portion of the startup current Is conducted to ground through the current discharge circuits 141 correspondingly increases. In this embodiment, by adjusting the number of conducted current discharge circuits 141, the slow soft-startup circuit 14 can decide the time period from the valley to the peak in the startup voltage waveform. Please refer to the second predetermined time periods shown in FIGS. 5 and 7, wherein when the number of conducted current discharge circuits is fewer (or the current passing through the current source(s) 1411 is lower), the time period from the valley to the peak in each cycle of the startup voltage waveform is shorter, and the slope of the startup voltage waveform is higher. When the number of conducted current discharge circuits is more (or the current passing through the current source(s) 1411 is higher), the time period from the valley to the peak in each cycle of the startup voltage waveform is longer, and the slope of the startup voltage waveform is lower. Thus, the total current quantity supplied to the control terminal G in the second predetermined time period can be reduced, by controlling the current discharge circuits 141.

The current discharge circuit 141 can be designed according to its operation requirement, and FIG. 6 shows one embodiment of the current discharge circuit 141. In FIG. 6, each current discharge circuit 141 includes a current switch 1412 and a current source 1411. The current switch 1412 and the current source 1411 are connected in series, and the series circuit is coupled between the control terminal G of the primary side switch M and ground. When the current switch 1412 is conducted, the control terminal G of the primary side switch M is conducted to the ground through the current source 1411, to reduce the total current quantity supplied to the control terminal G in the second predetermined time period. According to the present invention, the slow soft-startup circuit 14 may include only one current discharge circuit 141, or plural current discharge circuits 141, wherein the current discharge circuit 141 can be embodied in various ways (e.g., including a variable current source, etc.), not limited to the embodiment shown in FIG. 6.

Figure 7:
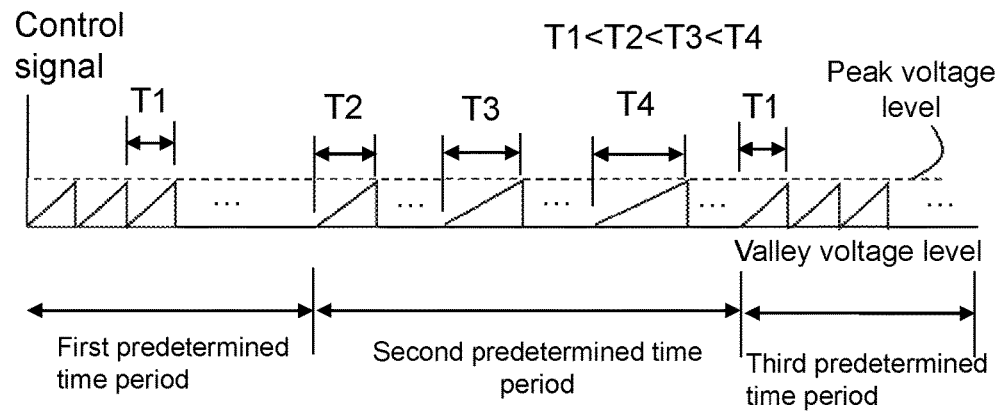
FIG. 7 shows a control signal according to another embodiment of the present invention.

FIG. 7 shows one embodiment of the present invention, wherein the slow soft-startup circuit 14 includes a plurality of current discharge circuits 141. When the switch control circuit 12 is in the startup status and the output voltage Vo does not reach the predetermined level in the first predetermined time period, the control unit 142 gradually increases a number of the conducted current discharge circuits 141, to gradually reduce the total current quantity in the second predetermined time period (Time periods T1<T2<T3<T4 in FIG. 7). Besides the aforementioned embodiment, the number of the current discharge circuit 141 can be controlled by other requirements. For example, the number of the conducted current discharge circuit 141 may be increased when an operation temperature of the primary side switch M is higher, and decreased when the operation temperature of the primary side switch M is lower.

When the control unit 142 conducts the current discharge circuits 141 till an end of the second predetermined time period, and the output voltage Vo does not reach the predetermined level in the second predetermined time period, the control unit 142 may stop conducting a few or all of the current discharge circuits or gradually (e.g. one by one) reduce the number of the conducted current discharge circuits 141 in a third predetermined time period, and it can be determined as to whether the output voltage reaches the predetermined level in the third predetermined time period. The third predetermined time period is another time period after the second predetermined time period. FIG. 7 shows an embodiment wherein all the current discharge circuits 141 are turned off in the third predetermined time period, so the time period from the valley to the peak is changed back to T1. In another embodiment, the time period may be changed sequentially from T4 to T3, from T3 to T2, and from T2 to T1. Or, the time period can be changed in other ways. Similar to the first predetermined time period, the control unit 142 may determine the time length of the second predetermined time period by any workable way.

When the output voltage Vo reaches the predetermined level in the third predetermined time period, the slow soft-startup circuit 14 stops controlling the total current quantity supplied to the control terminal G, and the switch control circuit takes control of the control terminal G. However, if the output voltage Vo does not reach the predetermined level in the third predetermined time period, the startup circuit and the slow soft-startup circuit 14 keep controlling the total current quantity supplied to the control terminal G. If the output voltage Vo does not reach the predetermined level in the third predetermined time period, the startup circuit and the slow soft-startup circuit 14 for example can take control in a manner similar to the second predetermined time period.

Figure 8:
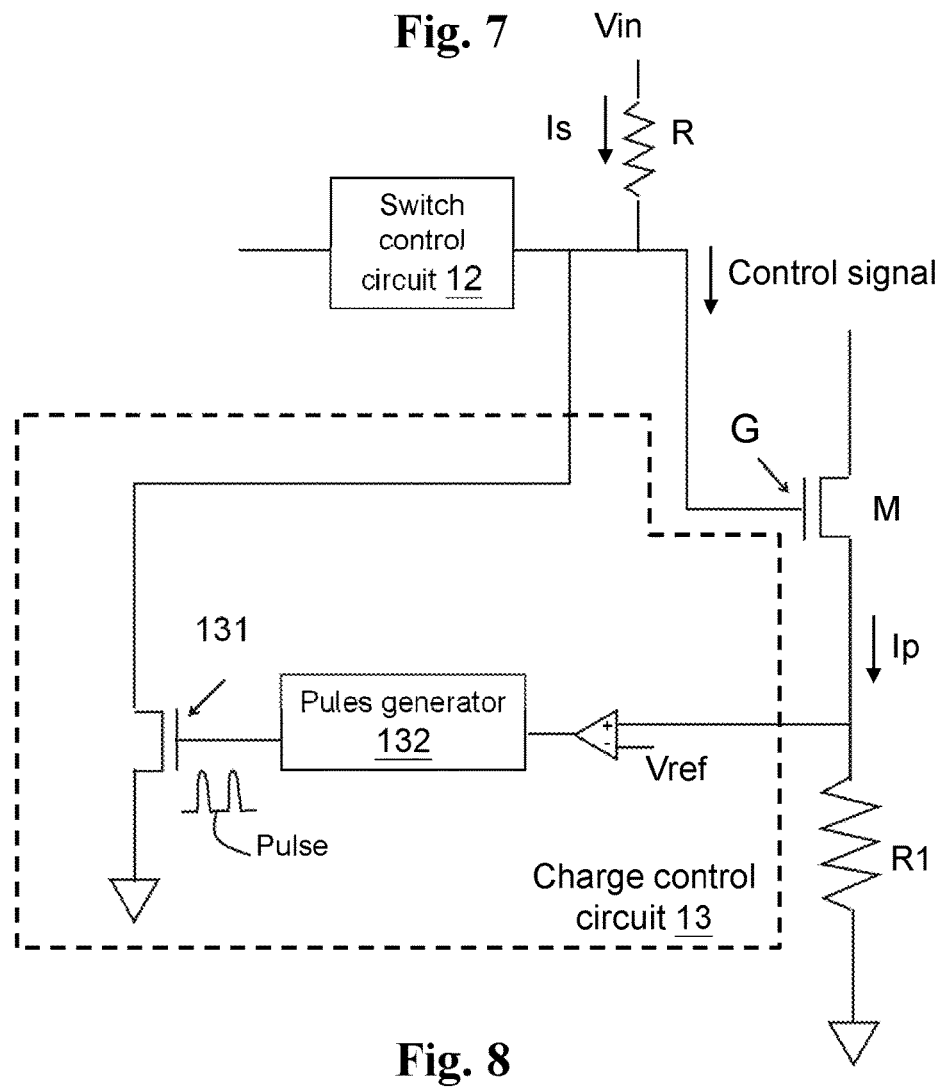
FIG. 8 shows a charge control circuit according to one embodiment of the present invention.

FIG. 8 shows one embodiment of the present invention, wherein the charge control circuit 13 includes: a grounding switch 131, coupled between the control terminal G of the primary side switch M and ground; and a pulse generator 132, configured to alternately generate a plurality of pulses for turning the grounding switch 131 on and off. In one embodiment, the pulse generator 132 may generate the pulses by: comparing the primary side current Ip and a reference (e.g., comparing the reference Vref and a voltage drop generated by the primary side current Ip passing through the resistor R1), to decide whether to conduct the grounding switch 131 or not. Accordingly, the control signal has a voltage waveform including repeated peaks and valleys.

Figure 9:
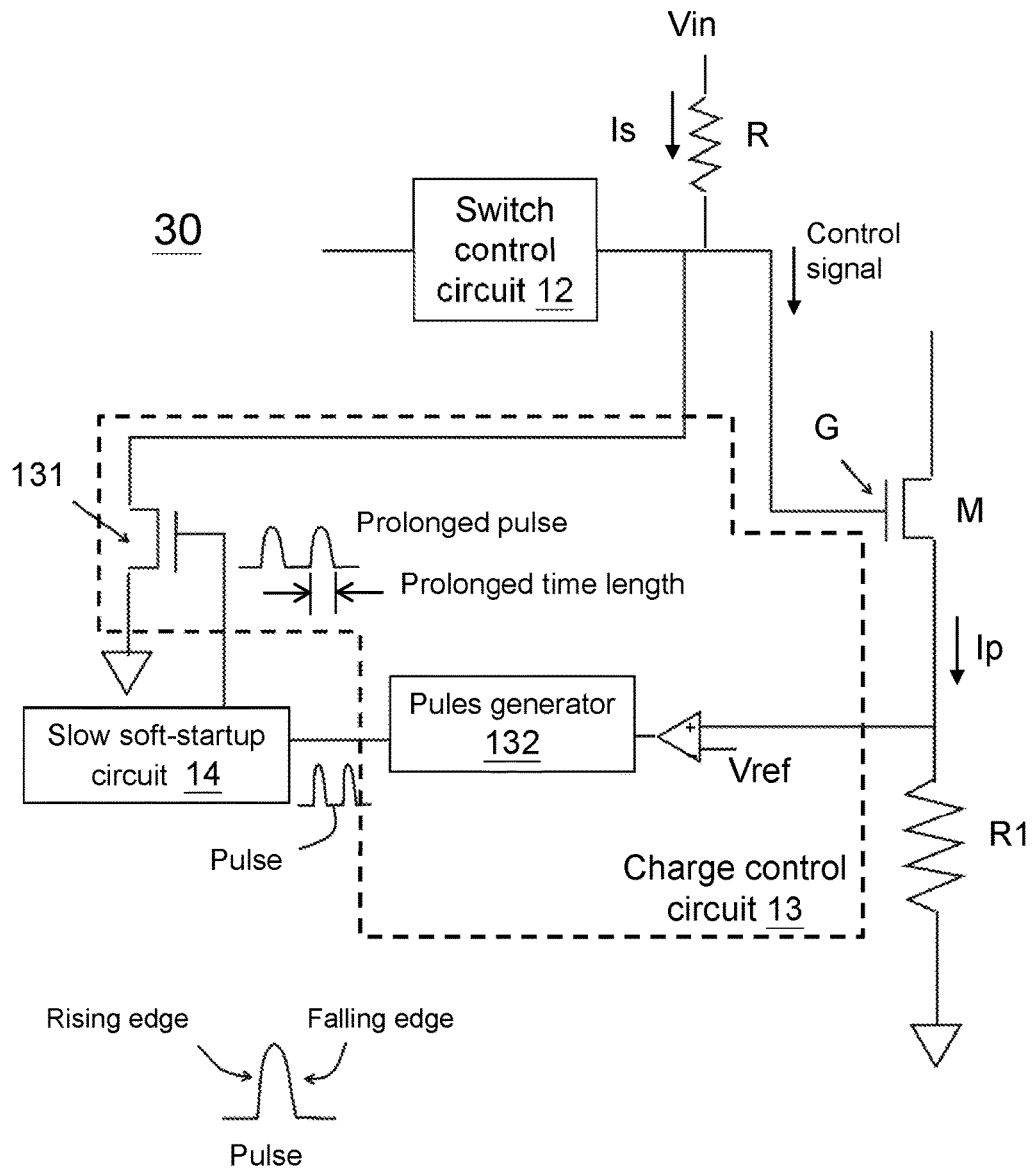
FIG. 9 shows a charge control circuit and a slow soft-startup circuit according to another embodiment of the present invention.
Figure 10:
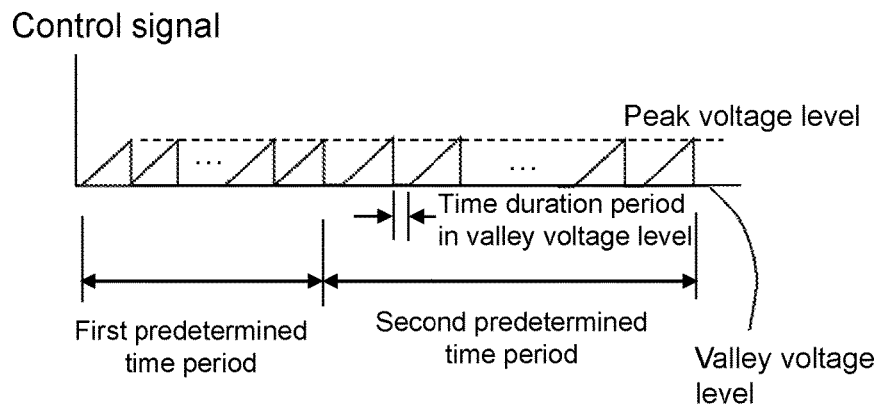
FIGS. 10, 11, and 12 show control signals according to several embodiments of the present inventions.
Figure 11:
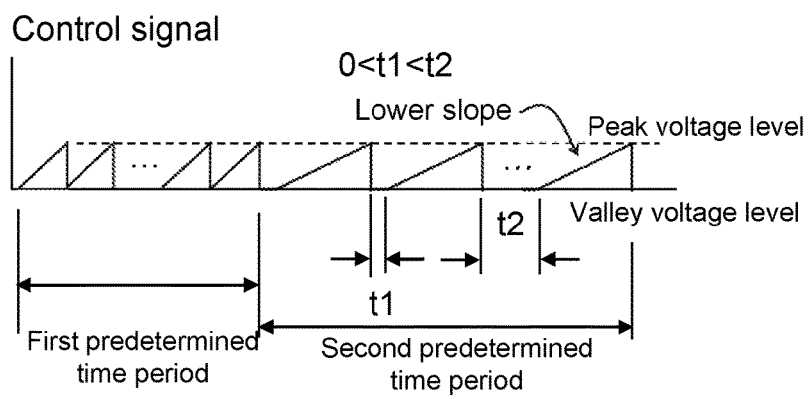

FIG. 9 shows the power conversion device 30 according to one embodiment of the present invention, wherein the slow soft-startup circuit 14 is coupled between the pulse generator 312 and the grounding switch 131, for prolonging a time length of the pulse. When the switch control circuit 12 is in the startup status and the slow soft-startup circuit 14 receives the pulse, the slow soft-startup circuit 14 prolongs a conduction time period of the grounding switch, to prolong a duration of the voltage waveform staying in the valley in the second predetermined time period. In the second predetermined time period, the prolonged duration staying in the valley in each cycle can be a constant, or can be gradually increased (e.g., see FIG. 11, 0<t1<t2). The slow soft-startup circuit 14 in FIGS. 9-11 reduces the total current quantity supplied to the control terminal G by directly conducting the control terminal G to ground. The slow soft-startup circuit 14 in FIGS. 9-11 is different from the slow soft-startup circuit 14 in FIG. 6; the latter includes the current source 1411 between the control terminal G of the primary side switch M. Although the slow soft-startup circuits 14 in FIGS. 6 and 9 are embodied in different forms, both of them can reduce the total current quantity supplied to the control terminal G. To embody FIG. 9, for example, the slow soft-startup circuit 14 may generate a rising edge of a prolonged pulse according to a rising edge of the pulse from the pulse generator 312, but generate a falling edge of the prolonged pulse by delaying a falling edge of the pulse from the pulse generator 312. Further, the slow soft-startup circuits 14 in FIGS. 6 and 9 may be combined to enhance the effect of reducing the total current quantity, as shown in FIG. 11. In FIG. 11, the control signal includes both the lower slope and the prolonged duration of the valley.

Figure 12:
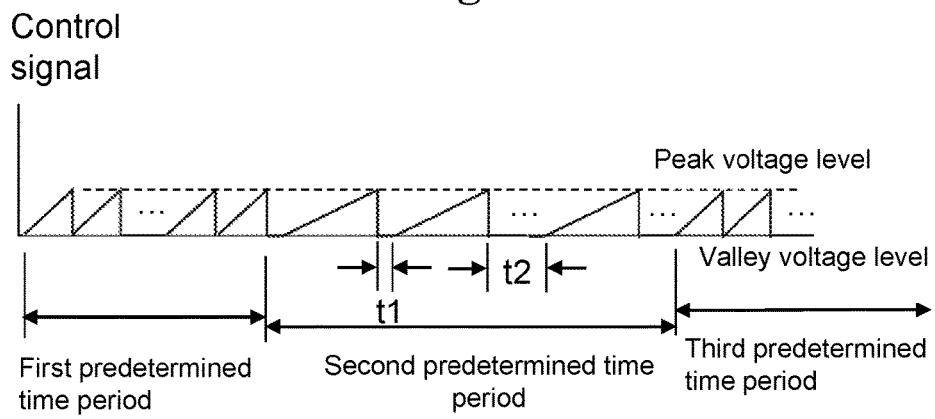

FIG. 12 shows another embodiment. When the slow soft-startup circuit 14 of FIG. 9 prolongs the ground conduction time of the control terminal G (i.e., prolongs the time length in the valley) till an end of the second predetermined time period, the slow soft-startup circuit 14 may change the time length of the pulse back to its original time length (in one embodiment, the time length of the pulse is directly reduced to its original time length; or in another embodiment, the time length of the pulse is gradually reduced, such as from t2 to t1, and then from t1 to about 0), in a third predetermined time period after in the second predetermined time period. In the third predetermined time period, it can be determined again as to whether the output voltage Vo reaches the predetermined level or not.

In one embodiment, the durations in the valleys do not necessarily have to increase or decrease by a gradual order. For example, it can be arranged such that when the operation temperature of the primary side switch M is higher, the durations in the valleys are increased, and when the operation temperature of the primary side switch M is lower, the durations in the valleys are decreased.

Figure 13:
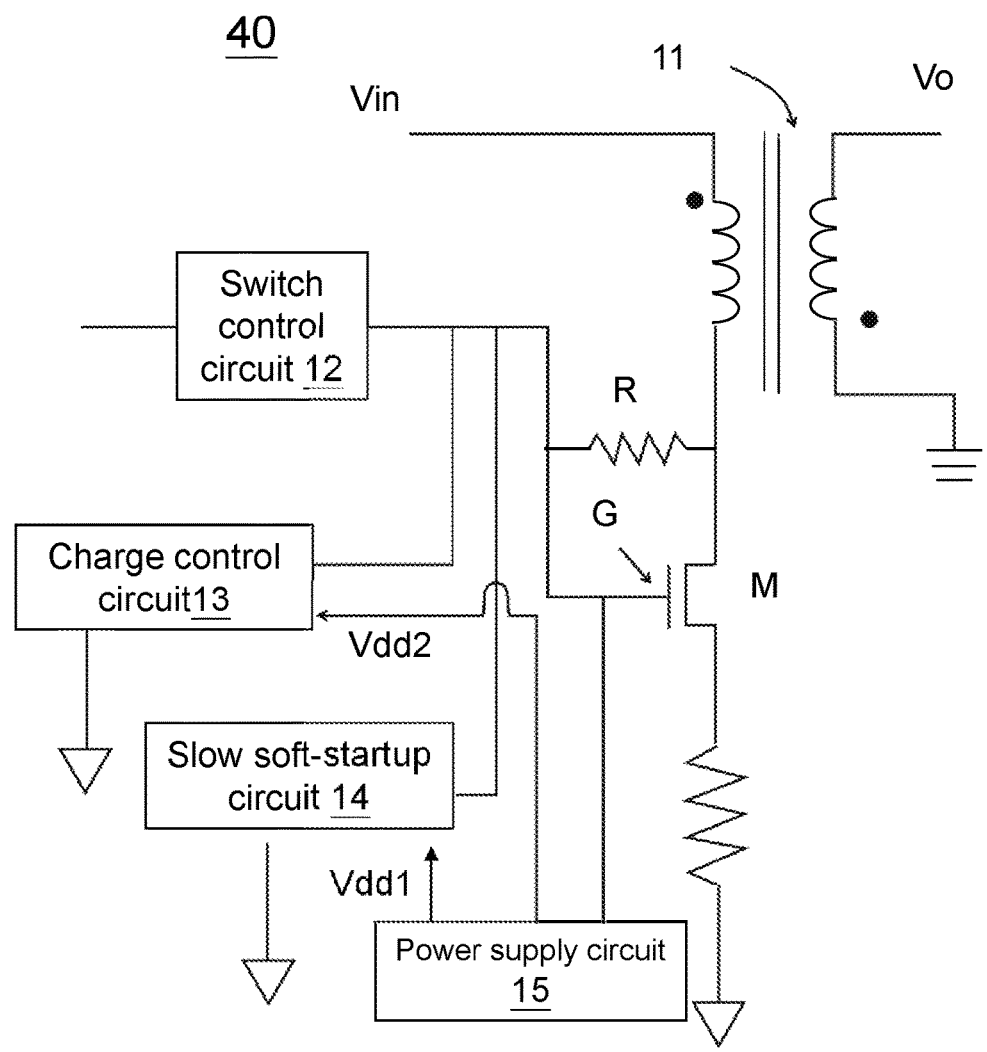
FIG. 13 shows a power conversion device according to one embodiment of the present invention.
Figure 14:
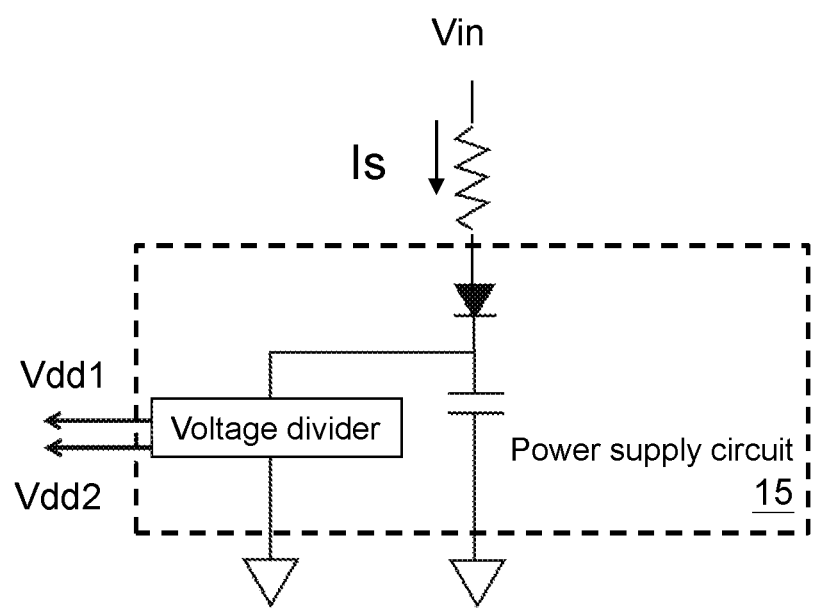
FIG. 14 shows a power supply circuit according to one embodiment of the present invention.

FIG. 13 shows the power conversion device 40 according to one embodiment of the present invention. The power conversion device 40 includes the switch control circuit 12, the charge control circuit 13, the slow soft-startup circuit 14, and a power supply circuit 15. This embodiment shows that the resistor R can be located at the location shown in FIG. 13, which provides an equivalent effect as in the location shown in the previous embodiments. The power supply circuit 15 is coupled to the control terminal G of the primary side switch M, for supplying voltages Vdd1 and Vdd2 to the charge control circuit 13 and the slow soft-startup circuit 14, respectively. The voltages Vdd1 and Vdd2 may be the same or different from each other. Because the charge control circuit 13 and the slow soft-startup circuit 14 need to work before the output voltage Vo reaches the predetermined level, the charge control circuit 13 and the slow soft-startup circuit 14 need a power supply other than the output voltage Vo. FIG. 14 shows the power supply circuit 15 according to one embodiment of the present invention, which includes a capacitor to supply voltages Vdd1 and Vdd2 to the slow soft-startup circuit 14 and the charge control circuit 13. If the charge control circuit 13 and the slow soft-startup circuit 14 need different voltages, a voltage divider can be used to provide the different voltages.

In one embodiment, the switch control circuit 12, the charge control circuit 13, and the slow soft-startup circuit 14 may be combined in one integrated circuit, or integrated into one power conversion chip.

The present invention has been described in considerable detail with reference to certain preferred embodiments thereof. It should be understood that the description is for illustrative purpose, not for limiting the scope of the present invention. Those skilled in this art can readily conceive variations and modifications within the spirit of the present invention; for example, there may be additional devices or circuits inserted between two devices or circuits shown to be in direct connection in the embodiments, as long as such inserted devices or circuits (such as a switch, a diode, a resistor, a filter, etc.) do not affect the primary function of the circuitry. All such modifications and variations should fall in the scope of the present invention. Besides, an embodiment or a claim of the present invention does not need to attain or include all the objectives, advantages or features described in the above. The abstract and the title are provided for assisting searches and not to be read as limitations to the scope of the present invention. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment.

What is claimed is:
1. A power conversion device, comprising:
a voltage conversion stage, including a transformer having a primary side for receiving a rectified voltage and a secondary side for generating an output voltage according to the rectified voltage, the primary side including a primary side switch which is controlled by a control signal to control a primary side current through the primary side;
a switch control circuit, having a startup status and a normal operation status, the switch control circuit providing the control signal to a control terminal of the primary side switch when the switch control circuit is in the normal operation status, for controlling a current conduction status of the primary side switch;
a startup circuit, configured to operably provide a current to the control terminal of the primary side switch when the switch control circuit is in the startup status, to at least partially conduct the primary side switch; and
a slow soft-startup circuit, configured to operably adjust the control signal when the switch control circuit is in the startup status, wherein when the output voltage does not reach a predetermined level in a first predetermined time period, the slow soft-startup circuit reduces a total current quantity supplied to the control terminal in a second predetermined time period, which is another time period after the first predetermined time period.

2. The power conversion device of claim 1, wherein the slow soft-startup circuit stops reducing the total current quantity supplied to the control terminal in a third predetermined time period, which is another time period after the second predetermined time period.

3. The power conversion device of claim 1, wherein when the switch control circuit is in the startup status, the startup circuit adjusts the control signal to have a voltage waveform including repeated peaks and valleys, and wherein the slow soft-startup circuit reduces the total current quantity supplied to the control terminal in the second predetermined time period by one or more of following steps:
the slow soft-startup circuit prolonging a time period from the valley to the peak in the second predetermined time period;
the slow soft-startup circuit reducing a frequency of reaching the peak in the second predetermined time period; and/or
the slow soft-startup circuit prolonging a duration of the voltage waveform staying at the valley.

4. The power conversion device of claim 1, wherein the slow soft-startup circuit includes:
at least one current discharge circuit, coupled between the control terminal of the primary side switch and ground; and
a control unit, configured to operably control a current conduction status of the current discharge circuit, wherein when the switch control circuit is in the startup status and the output voltage does not reach the predetermined level in the first predetermined time period, the control signal has a voltage waveform including repeated peaks and valleys, and the control unit conducts the at least one current discharge circuit to prolong a time period from the valley to the peak in the second predetermined time period.

5. The power conversion device of claim 4, wherein each current discharge circuit includes a current switch and a current source connected in series, the series circuit of the current switch and the current source being coupled between the control terminal of the primary side switch and ground, wherein when the current switch is conducted, the control terminal of the primary side switch is conducted to the ground through the current source, to reduce the total current quantity supplied to the control signal in the second predetermined time period.

6. The power conversion device of claim 4, wherein the slow soft-startup circuit includes a plurality of current discharge circuits, wherein when the switch control circuit is in the startup status and the output voltage does not reach the predetermined level in the first predetermined time period, the control unit gradually increases a number of the current discharge circuits which are conducted in the second predetermined time period, to reduce the total current quantity supplied to the control signal in the second predetermined time period.

7. The power conversion device of claim 6, wherein when the control unit conducts the current discharge circuits till an end of the second predetermined time period, the control unit stops conducting the current discharge circuits, so as to determine whether the output voltage reaches the predetermined level in the third predetermined time period, wherein the third predetermined time period is another time period after the second predetermined time period.

8. The power conversion device of claim 1, wherein when the output voltage reaches the predetermined level, a power-on reset signal is generated to switch the switch control circuit from the startup status to the normal operation status.

9. The power conversion device of claim 8, wherein the slow soft-startup circuit stops adjusting the control signal according to the power-on reset signal.

10. The power conversion device of claim 1, wherein when the switch control circuit is in the startup status, the startup circuit adjusts the control signal to have a voltage waveform including repeated peaks and valleys, wherein the startup circuit includes:
a resistor, coupled between the rectified voltage and the control terminal of the primary side switch;
a grounding switch, coupled between the control terminal of the primary side switch and ground; and
a pulse generator, configured to alternately generate a plurality of pulses for turning the grounding switch on and off.

11. The power conversion device of claim 10, wherein the slow soft-startup circuit is coupled between the pulse generator and ground, and is configured to prolong a time length of at least one of the pulses, wherein when the switch control circuit is in the startup status and the slow soft-startup circuit receives the pulse, the slow soft-startup circuit prolongs a conduction time period of the grounding switch, so as to prolong a duration of the voltage waveform staying at the valley.

12. The power conversion device of claim 1, further comprising a power supply circuit, which is coupled to the control terminal of the primary side switch, for supplying power to the startup circuit and the slow soft-startup circuit.

13. A slow soft-startup circuit, for controlling a voltage conversion circuit which includes a transformer having a primary side for receiving a rectified voltage and a secondary side for generating an output voltage according to the rectified voltage, the primary side including a primary side switch, wherein the voltage conversion circuit further includes a switch control circuit and a startup circuit, the switch control circuit having a startup status and a normal operation status, the switch control circuit in the startup status providing a control signal to the control terminal of the primary side switch to at least partially conduct the primary side switch, the slow soft-startup circuit comprising:
at least one current discharge circuit, coupled between the control terminal of the primary side switch and ground; and
a control unit, configured to operably control a current conduction status of the current discharge circuit, wherein when the switch control circuit is in the startup status and the output voltage does not reach a predetermined level in a first predetermined time period, the control unit conducts the at least one current discharge circuit in a second predetermined time period after the first predetermined time period, to reduce a total current quantity supplied to the control terminal in the second predetermined time period.

14. The slow soft-startup circuit of claim 13, wherein the slow soft-startup circuit stops reducing the total current quantity supplied to the control terminal in a third predetermined time period which is another time period after the second predetermined time period.

15. The slow soft-startup circuit of claim 13, wherein when the output voltage reaches the predetermined level, a power-on reset signal is generated, and the slow soft-startup circuit stops reducing the total current quantity supplied to the control terminal according to the power-on reset signal.

16. The slow soft-startup circuit of claim 13, wherein the slow soft-startup circuit includes a plurality of current discharge circuits, wherein when the switch control circuit is in the startup status and the output voltage does not reach the predetermined level in the first predetermined time period, the control unit gradually increases a number of the current discharge circuits which are conducted in the second predetermined time period, to reduce the total current quantity supplied to the control signal in the second predetermined time period.

17. The slow soft-startup circuit of claim 13, wherein when the control unit conducts the current discharge circuits till an end of the second predetermined time period, the control unit stops conducting the current discharge circuits, so as to determine whether the output voltage reaches the predetermined level in the third predetermined time period, wherein the third predetermined time period is another time period after the second predetermined time period.

18. A power conversion chip, for controlling a voltage conversion stage which includes a primary side for receiving a rectified voltage and a secondary side for generating an output voltage according to the rectified voltage, the primary side including a primary side switch which includes a control terminal for receiving a startup current from the rectified voltage, wherein the voltage conversion chip has a startup status and a normal operation status, the power conversion chip comprising:

a switch control circuit, providing a control signal to a control terminal of the primary side switch when the switch control circuit is in the normal operation status;

a startup circuit including:

a grounding switch, coupled between the control terminal of the primary side switch and ground; and a pulse generator, configured to operably generate a pulse by comparing a primary side current and a reference value, wherein the pulse conducts the control terminal of the primary side switch to ground, such that the control terminal of the primary side switch receives a voltage waveform including repeated peaks and valleys; and a slow soft-startup circuit, coupled between the pulse generator and the grounding switch, wherein when the power conversion chip is in the startup status and the output voltage does not reach a predetermined level in a first predetermined time period, the slow soft-startup circuit prolongs a duration of the voltage waveform staying at the valley in a second predetermined time period which is another time period after the first predetermined time period.

\* \* \* \* \*